United States Patent
Hiwaki et al.

(10) Patent No.: US 6,836,051 B2
(45) Date of Patent: Dec. 28, 2004

(54) MOTOR

(75) Inventors: Hideharu Hiwaki, Kadoma (JP);
Toshiyuki Tamamura, Kusatsu (JP);
Haruhiko Kado, Kadoma (JP); Hiroshi Itoh, Hirakata (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/725,375

(22) Filed: Dec. 3, 2003

(65) Prior Publication Data
US 2004/0119367 A1 Jun. 24, 2004

(30) Foreign Application Priority Data
Dec. 19, 2002 (JP) .................................. 2002-367965

(51) Int. Cl.$^7$ .................................................. H02K 1/12
(52) U.S. Cl. ...................................... 310/258; 310/51
(58) Field of Search ........................ 310/51, 216–218, 310/254, 258, 259, 52–64

(56) References Cited

U.S. PATENT DOCUMENTS

| | | | | |
|---|---|---|---|---|
| 2,136,301 A | * | 11/1938 | Hoddy et al. | 310/40 R |
| 2,810,847 A | * | 10/1957 | Tweedy | 310/254 |
| 2,953,699 A | * | 9/1960 | Redding Jr. | 310/258 |
| 3,278,773 A | * | 10/1966 | Mikina | 310/51 |
| 4,990,809 A | * | 2/1991 | Artus et al. | 310/192 |
| 5,045,742 A | * | 9/1991 | Armstrong et al. | 310/254 |
| 5,173,629 A | * | 12/1992 | Peters | 310/216 |
| 5,365,132 A | * | 11/1994 | Hann et al. | 310/58 |
| 6,544,009 B2 | * | 4/2003 | Makino et al. | 417/312 |
| 6,623,253 B1 | * | 9/2003 | Onoda et al. | 417/366 |
| 6,680,550 B2 | * | 1/2004 | Matsunaga et al. | 310/58 |
| 6,700,273 B1 | * | 3/2004 | Ojima et al. | 310/166 |

FOREIGN PATENT DOCUMENTS

| | | |
|---|---|---|
| JP | 62-147924 | 7/1987 |
| JP | 2001-78375 | 3/2001 |
| JP | 2002-213384 | 7/2002 |

* cited by examiner

*Primary Examiner*—Dang Le
(74) *Attorney, Agent, or Firm*—Parkhurst & Wendel, L.L.P

(57) ABSTRACT

A motor is provided that reduces vibration and noise by suppressing the vibration transmitted from a stator to a housing. Also an apparatus loaded with this motor is provided, that is highly efficient with less vibration and low noise. Notches formed at an outer circumference of a yoke are located on outer peripheral sides of slots, the notches are not in contact with the housing, the yoke located on outer circumferential sides of teeth is provided with axially penetrating through-holes, and an outer circumference of the stator core located on outer circumferential sides of the through-holes is in close contact with the housing, thus making it possible to obtain the motor with high efficiency, less vibration and low noise.

7 Claims, 4 Drawing Sheets

MOTOR

FIELD OF THE INVENTION

The present invention relates to a concentrated winding motor that is highly efficient and capable of reducing vibration and noise, and an apparatus loaded with the concentrated winding motor, which is highly efficient with low noise and less vibration, such as a hermetically enclosed compressor, a refrigerating apparatus (a refrigerator, a freezer, an ice making machine, a showcase, a vending machine), an air conditioner (an air-conditioner, a dehumidifier) or an electronic circuit cooling system, or a car actuator and an automobile or the like loaded with this car actuator.

BACKGROUND OF THE INVENTION

Conventionally, concentrated winding motors generally used in a compressors and the like of air conditioners and refrigerators are each composed of a stator 40 and a rotor 50 as shown in FIG. 8.

The stator 40 has teeth 42 provided at a stator core 41, and slots 43. Three-phase winding wires 44U, 44V and 44W are provided to the teeth 42 with an insulating material (an insulating film, an insulator or the like: not shown) between the wires and the stator core 41.

The stator core 41 faces an outer circumference of the rotor 50, and has teeth tip end broad portions 45 usually placed to be wide at tip ends of the teeth 42, a substantially annular yoke 46 for connecting the respective teeth, and through-holes 47 in an outer circumference of the stator core 41.

The through-hole 47 is formed between a housing 61 and the stator core 41 when the stator 40 is shrinkage-fitted into the compressor housing 61 of a hermetically enclosed compressor, and serves as a passage for a refrigerant (for example, see Japanese Unexamined Patent Publication No. 2001-78375).

Alternatively, through-holes are provided in an outer circumferential part of the stator core in some cases (see Japanese Unexamined Patent Publication No. 62-147924).

The winding wires are of three phases of U, V and W phases, and sine wave drive and rectangular wave drive are performed by controlling applied voltage with an inverter.

The rotor 50 is rotatably held concentrically with the stator 40 inside the stator 40, and a rotor core 51 in FIG. 8 represents an embedded magnet type rotor in which permanent magnets 52 are embedded.

End plates (not shown) are mounted to both ends of the rotor core 51, and they are fixed by caulking after inserting rivets (not shown) through a through hole provided in the rotor core 51. A shaft is inserted into a shaft hole 53.

The rotor 50 rotates around the shaft by rotating force of a sum of magnet torque and reluctance torque by a rotating magnetic field by an electric current passing through the winding wires 44U, 44V and 44W applied to the stator 40.

In the above-described conventional concentrated winding motor, magnetic flux intensively flows into the aforesaid teeth 42 in its structure, and therefore a radial force (the force in a radius direction) to deform the stator 40 tends to be large.

Especially in a motor driven by rectangular wave voltage or a rectangular wave current, an electric current always passes through only two phases out of the three phase winding wires applied to the teeth 42, and therefore magnetic flux concentrates on two teeth 42 per pole pair, which imbalances the radial force and causes elliptical vibration more easily as compared with distributed winding, thus further increasing vibration and noise of the motor.

In the prior art, notches (the through-holes 47 in FIG. 8) are provided at the yoke 46 located on outer circumferential sides of the teeth 42 to prevent contact with the housing 61, so that the vibration by the radial force concentrated on the teeth 42 is not directly transmitted to the housing 61, and thus the vibration of the motor is suppressed. However, in this case, the vibration of the teeth 42 adjacent to each other causes the yoke 46 to vibrate, and the noise of the motor cannot be prevented from increasing, either.

Moreover, in the case in which the stator 40 is shrinkage-fitted into the housing 61, stress from the housing 61 is applied to the yoke 46, and therefore there arises the problem that iron loss increases. However, to ensure reliability of the motor, holding force of the stator core 41 and the housing 61 has to be kept, and therefore it is necessary to bring the yoke 46 and the housing 61 in close contact with each other.

DISCLOSURE OF THE INVENTION

In view of the aforesaid conventional problems, the present invention has its object to provide a motor that reduces vibration and noise by suppressing the vibration transmitted from a stator to a housing, and an apparatus loaded with the motor, which is highly efficient with less vibration and low noise.

In order to solve the above-described problems, in the present invention, notches are provided in an outer circumference of a yoke adjacent to outer peripheries of slots, so that the notches do not contact the housing, the yoke located adjacent outer peripheries of teeth is provided with axially penetrating through-holes, and an outer circumference of the stator core located adjacent outer peripheries of the through-holes is in close contact with the housing. Thus, it becomes possible to obtain the motor with high efficiency, less vibration and low noise.

A motor according to the first aspect of the present invention is a motor comprising: a stator having an annular yoke, a plurality of teeth disposed at an inner circumferential portion of the yoke and a stator core formed with slots between the plurality of teeth, with three-phase concentrated winding wires provided to the teeth; and a rotor rotatably held in an opposed relation to an inner circumference of the stator via a small clearance, and provided with permanent magnets inside or on a surface of the rotor core. The stator core has an outer circumference being partly in close contact with and held by a housing. The motor is characterized in that the yoke located adjacent to outer circumferences of the teeth is provided with axially penetrating through-holes, and the outer circumference of the stator core located adjacent to outer circumferences of the through-holes is in close contact with the housing. Consequently, radial force applied to the teeth is distributed by the through-holes and is restrained from being transmitted to the housing. In addition to this, the outer circumference of the stator core located adjacent to the outer circumferences of the through holes is in close contact with the housing, whereby holding force of the stator core and the housing can be sufficiently kept, and therefore the highly reliable motor with less vibration and low noise can be obtained.

A motor according to the second aspect of the present invention is a motor comprising: a stator having an annular yoke, a plurality of teeth disposed at an inner circumferential portion of the yoke and stator core formed with slots between the plurality of teeth, with three-phase concentrated winding wires provided to the teeth; and a rotor rotatably held in an opposed relation to an inner circumference of the stator via a small clearance, and provided with permanent magnets inside or on a surface of the rotor core. The stator core has an outer circumference being partly in close contact with and held by a housing. The motor is characterized in that a notch is formed in an outer circumference of the yoke located adjacent to an outer periphery of the slot so that the outer circumference of the stator core does not contact the housing in the notch. Consequently, the vibration is not transmitted to the housing from the notch, and stress is not applied to the yoke, whereby iron loss is reduced, vibration and noise of the motor are reduced, and in addition, high efficiency can be realized.

A motor according to the third aspect of the present invention is a motor comprising: a stator having an annular yoke, a plurality of teeth disposed at an inner circumferential portion of the yoke and a stator core formed with slots between the plurality of teeth, with three-phase concentrated winding wires provided to the teeth; and a rotor rotatably held in an opposed relation to an inner circumference of the stator via a small clearance, and provided with permanent magnets inside the rotor core or on a surface of the rotor core. The stator core has an outer circumference partly being in close contact with and held by a housing. The motor is characterized in that a plurality of notches are formed in an outer circumference of the yoke located adjacent to an outer periphery of the slot, and the stator core does not contact the housing at least on an extension line of an outer circumference of the stator core in a substantially central portion with respect to a peripheral direction of the slot. By thus forming a plurality of notches, the vibration mode of the motor can be changed, and the substantially central portion of the notch does not contact the housing so that even when the adjacent teeth vibrate in a direction to attract one another or repulse one another, the location subjected to the largest vibration does not contact the housing, and stress applied to the yoke can be reduced.
Consequently making it possible to reduce vibration and noise of the motor and realize high efficiency.

A motor according to the fourth aspect of the present invention is a motor comprising: a stator having an annular yoke, a plurality of teeth disposed at an inner circumferential portion of the yoke and a stator core formed with slots between the plurality of teeth, with three-phase concentrated winding wires provided to the teeth; and a rotor rotatably held in an opposed relation to an inner circumference of the stator via a small clearance, and provided with permanent magnets inside or on a surface of the rotor core. The stator core having an outer circumference partly being in close contact with and held by a housing. The motor is characterized in that a notch is formed in an outer circumference of the yoke located adjacent to an outer periphery of the slot so that the outer circumference of the stator core does not contact the housing in the notch, that the axially penetrating through-holes are provided in the yoke located adjacent to outer circumferences of the teeth, and the outer circumference of the stator core located adjacent to an outer circumference of the through-holes is in close contact with the housing. Thus, the radial force applied to the teeth can be distributed by the through-holes and restrained from being transmitted to the housing, and the vibration is not transmitted to the housing from the notches, whereby the vibration and noise of the motor can be reduced. In addition, the outer circumference of the stator core located adjacent to the outer circumferences of the through-holes is in close contact with the housing, whereby the holding force of the stator core and the housing can be sufficiently kept, and stress is not applied to the yoke, whereby iron loss is reduced. Consequently, the motor with high efficiency, less vibration, low noise and high reliability can be obtained.

A motor according to the fifth aspect of the present invention is any one of the motors describe above. The motor is characterized in that the notch provided in the outer circumference of the yoke located adjacent to the outer periphery of the slot, is provided to be in a substantially arc shape to be substantially concentric with the housing. Consequently, the shape of the notch can be made in the minimum size to prevent vibration from being transmitted to the housing from the stator core, whereby an area of the slot can be made larger and efficiency of the motor is enhanced.

A motor according to the sixth aspect of the present invention is any one of the motors described above. The motor is characterized in that when it is assumed that the number of the teeth is N, the stator core is in close contact with the housing in at least N/2 spots out of N spots on the outer circumference of the stator core located adjacent to the outer circumferences of the teeth. Thus, by changing the portions in close contact with the housing, the vibration mode transmitted to the housing from the stator core can be changed. Consequently, vibration and noise can be reduced.

The seventh aspect of the present invention relates to an apparatus loaded with any one of the motors described above. Consequently, vibration and noise of the apparatus can be reduced.

DESCRIPTION OF THE EMBODIMENTS

Figure 1:
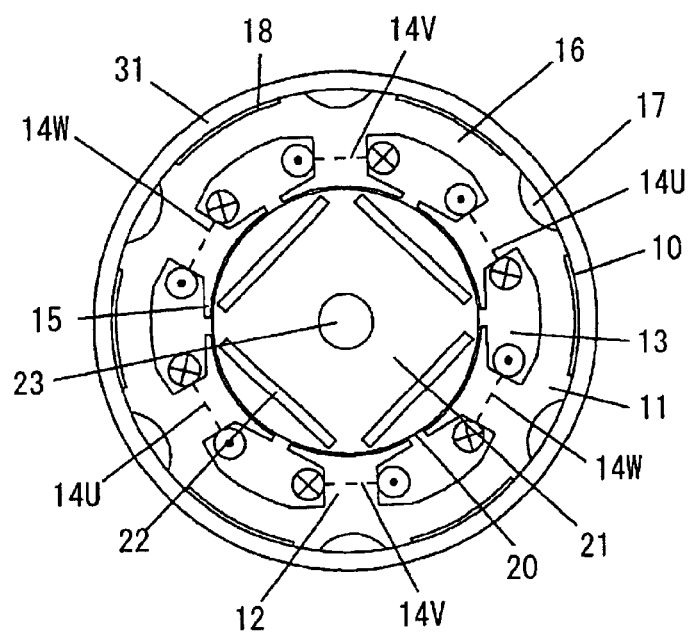
FIG. 1 is a sectional view of a motor in which a yoke is provided with notches according to a first embodiment of the present invention.

Each embodiment of the present invention will be explained below based on the drawing.

(Embodiment 1)

As shown in FIG. 1, a concentrated winding brushless motor used in a compressor of an air conditioner, a refrigerator or the like is constituted of a stator 10 and a rotor 20, and the stator 10 has teeth 12 and slots 13 provided in a stator core 11. Three-phase winding wires 14U, 14V and 14W provided to the teeth 12 with an insulating material (an insulating film, an insulator, or the like: not shown) between the wires and the stator core 11.

The stator core 11 faces an outer circumference of the rotor 20, and has tooth tip end broad portions 15 placed to be wide at tip ends of the teeth 12, a substantially annular yoke 16 for connecting the respective teeth, and through-holes 17 in an outer circumference of the stator core 11.

When the stator 10 is shrinkage-fitted into a housing 31 of the compressor, the stator 10 has the through-holes 17 between the housing 31 and the stator core 11, and the through-holes 17 serve as passages for a refrigerant.

A notch 18 is provided in an outer circumference of the yoke 16 located on an outer peripheral side of the slot 13. If width in a diameter direction, of the yoke 16 is made smaller by the notch 18, core loss is increased. When the width of the yoke 16 is not changed, an area of the slot 13 becomes smaller than the prior art, and the copper loss increases, therefore reducing efficiency of the motor. Consequently, it is suitable to make the form of the notch 18 a substantially arc shape so as to be substantially concentric with the housing 31, and make the notch 18 in a minimum shape which prevents vibration from being transmitted to the housing 31 from the stator core 11. This can reduce iron loss by stress which is applied to the yoke 16, and can make the area of the slot 13 sufficiently large, and therefore copper loss does not increase, thus enhance efficiency of the motor. It is preferable that a size of the notch 18 in a diameter direction is 1 mm or less.

Figure 2:
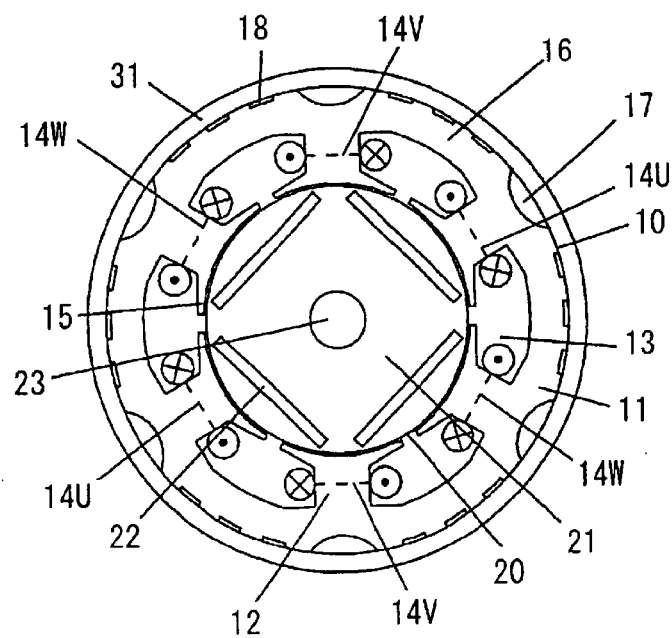
FIG. 2 is a sectional view of the motor in which each notch of the yoke is formed in a plurality of sectioned notches according to the first embodiment of the present invention.

FIG. 2 shows the motor provided with a plurality of notches 18, and in the form in FIG. 2, stress applied to the yoke 16 can be also reduced, in addition to which, vibration transmitted to the housing 31 can be suppressed. In this case, it is desirable to provide the notch 18 on an extension line of a substantially central portion in a peripheral direction of the slot 13.

Figure 3:
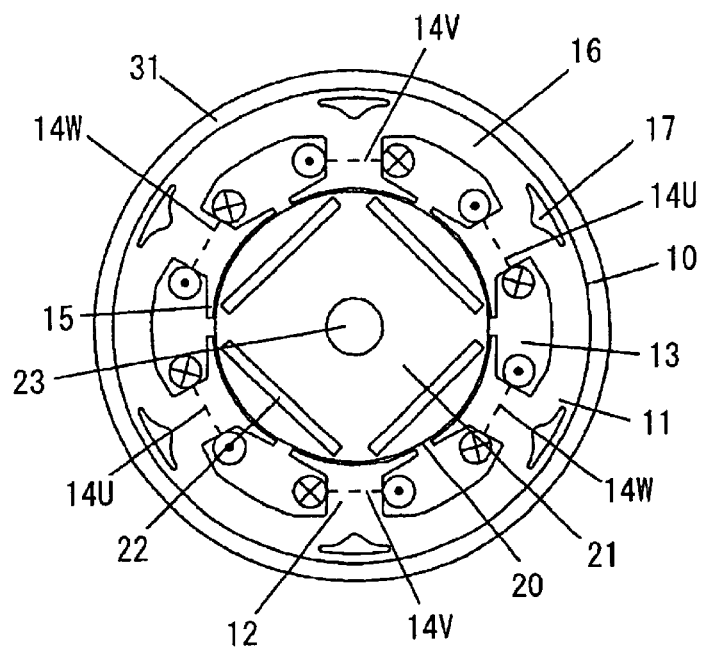
FIG. 3 is a sectional view of the motor in which the yoke at bases of teeth is provided with through-holes, and an outer circumferences of the through-holes are in close contact with a housing according to the first embodiment of the present invention.

FIG. 3 shows the motor in which through-holes 17 are provided in portions located on outer peripheral sides of the teeth 12, and portions of the stator core 11, that are located on outer peripheral sides of the through-holes 17, are in close contact with the housing 31. In FIG. 3, if the through-hole 17 is expanded widely in a direction of the tooth 12, iron loss is increased, which reduces the efficiency of the motor, and therefore it is desirable to determine the location and the size of the through-hole 17 so as to be able to sufficiently take the width of a bottom portion of the tooth 12.

Figure 4:
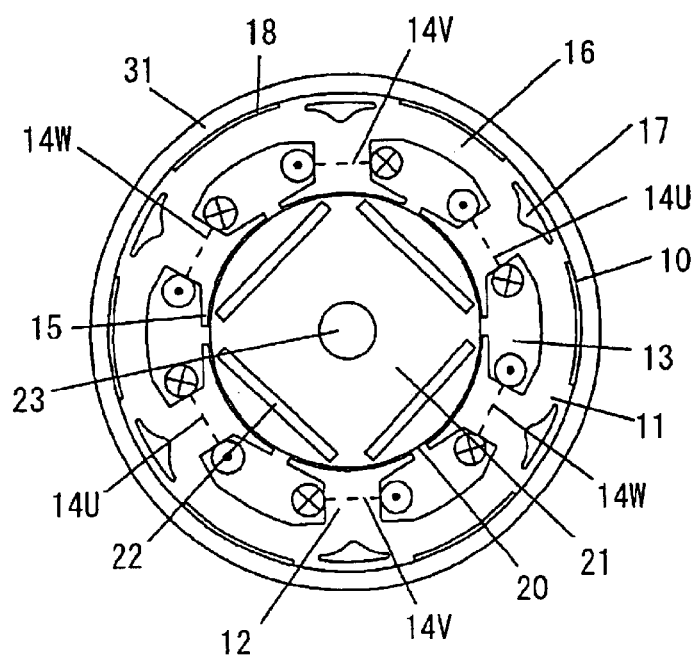
FIG. 4 is a sectional view of the motor in which the yoke at the bases of teeth is provided with the through-holes, and the yoke on an outer peripheral side of a slot is provided with the notches according to the first embodiment of the present invention.

FIG. 4 shows the motor in which the notch 18 shown in FIG. 1 and the through-hole 17 shown in FIG. 3 are combined. By adopting this form, vibration and noise can be reduced sharply in addition to efficiency of the motor being enhanced. It is also possible to provide a plurality of notches 18 shown in FIG. 2.

Figure 5:
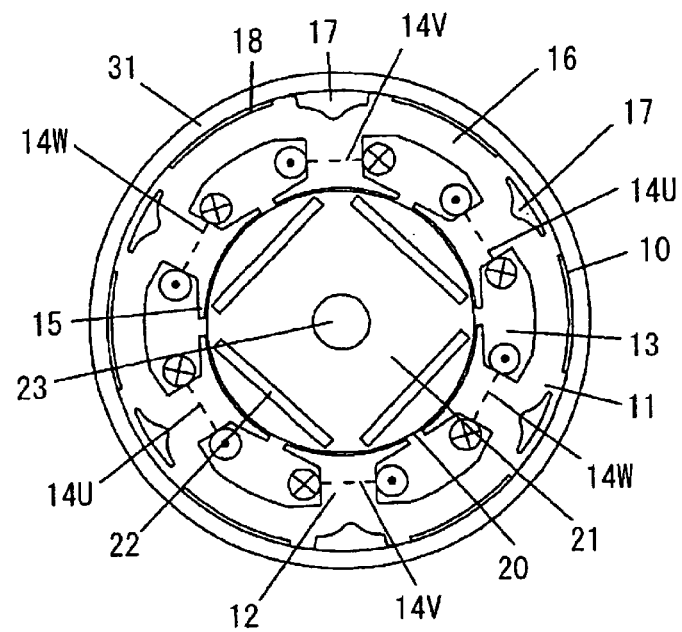
FIG. 5 is a sectional view of the motor in which part of a stator core on outer circumferential sides of the through-holes is not in close contact with the housing according to the first embodiment of the present invention.

FIG. 5 shows the motor in which the number of teeth 12 is six, and among six spots on the outer circumferential portion of the stator core 11, which are located on an outer circumferential sides of the teeth 12, four spots (N/2=3 spots or more) are in close contact with the housing 31. By changing the portions where the stator core 11 and the housing 31 are in close contact with each other, a manner of vibration transmission is changed, and therefore the location of close contact can be selected in accordance with a service environment of the motor.

(Embodiment 2)

Figure 6:
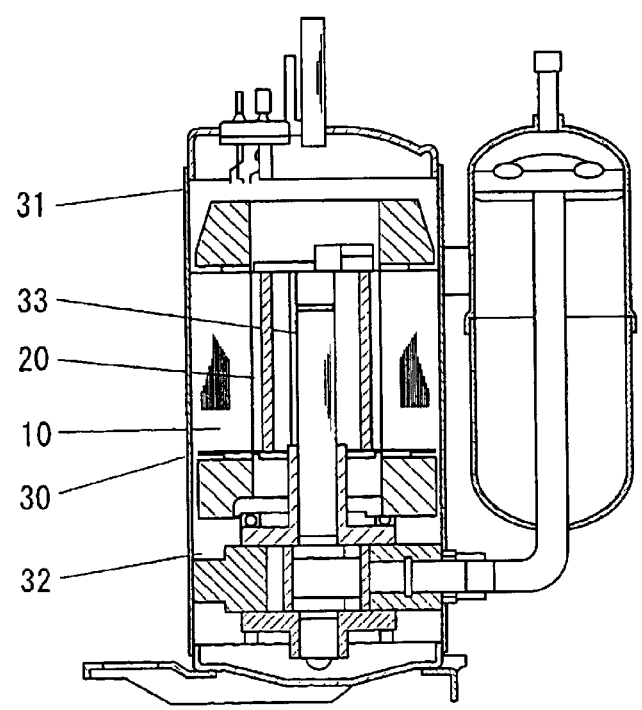
FIG. 6 is a view showing a hermetically enclosed compressor loaded with the motor of the present invention.

FIG. 6 shows a hermetically enclosed compressor loaded with the motor of the present invention.

In FIG. 6, a hermetically enclosed compressor 30 is constructed by the housing 31 for keeping an inside of the compressor in a sealed state from an outside, a mechanical portion 32 for performing compression, the stator 10 and the rotor 20. The stator 10 is fixed to the compressor housing 31 by shrinkage fit or press fit, and the rotor 20 is fixed to a shaft 33 extending from the mechanical portion 32 by shrinkage fit or press fit.

Though it is possible to realize high efficiency, and reduction in vibration and noise of the apparatus irrespective of the kinds of refrigerants, HFC, natural refrigerants ($CO_2$, ammonia, and the like) and the like are preferable in view of environmental friendliness.

The hermetically enclosed compressor is also capable of realizing high efficiency, and reduction in vibration and noise of the apparatus when it is used in a car actuator, and by using this car actuator in an automobile, high efficiency and reduction in vibration and noise of the automobile can be realized.

Figure 7:
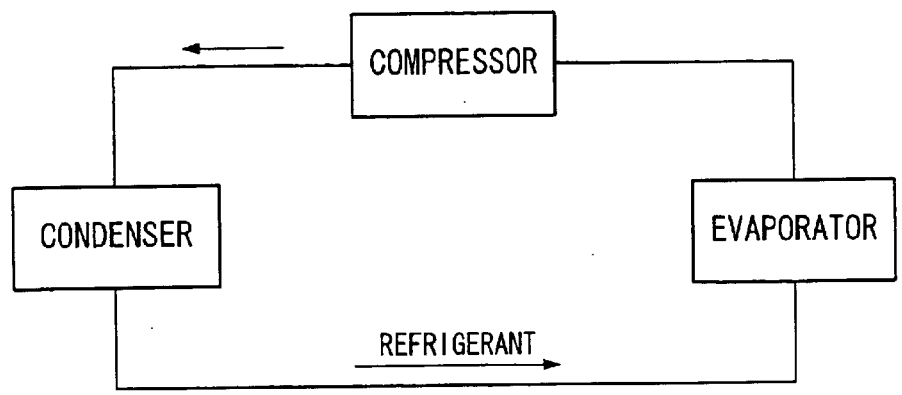
FIG. 7 is a diagram showing a refrigerating cycle including the hermetically enclosed compressor of the present invention.
Figure 8:
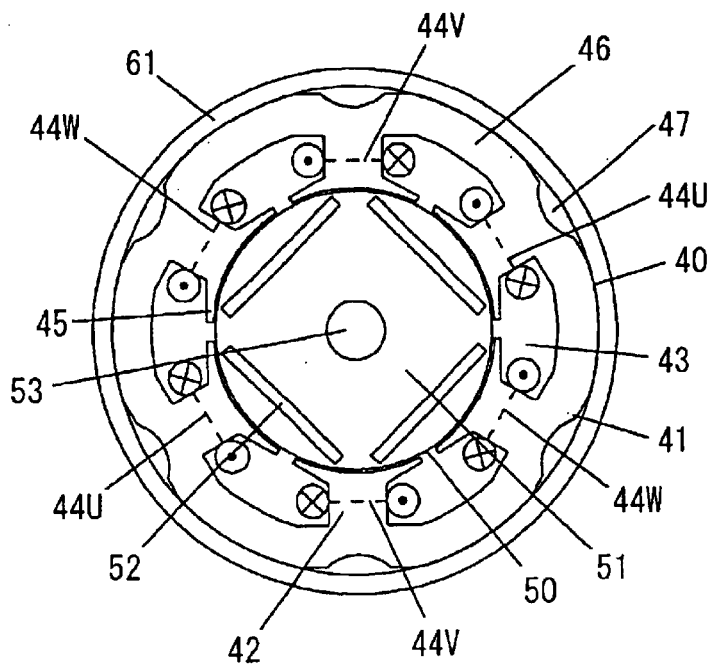
FIG. 8 is a sectional view of a conventional concentrated winding motor.

Further, FIG. 7 shows a refrigerating cycle including the hermetically enclosed compressor. The refrigerating cycle is constructed by the hermetically enclosed compressor, a condenser and an evaporator, and is loaded on each of various kinds of apparatuses. The refrigerating cycles are loaded on refrigerating apparatuses (refrigerators, freezers, ice making machines, showcases, and vending machines), air conditioners (air-conditioners, and dehumidifiers) or electronic circuit cooling systems and the like.

As is obvious from the above-described embodiments, according to a motor according to claim 1 of the present invention, the yoke located on outer circumferential sides of the teeth is provided with axially penetrating through-holes, and the outer circumference of the stator core located on outer circumferential sides of the through-holes is in close contact with the housing. Consequently, a radial force applied to the teeth is distributed by the through-holes and is restrained from being transmitted to the housing, and the outer circumference of the stator core located on the outer circumferential sides of the through-holes is in close contact with the housing, whereby holding force of the stator core and the housing can be sufficiently kept, and therefore the highly reliable motor with less vibration and low noise can be obtained.

According to a motor according to claim 2 of the present invention, by providing a notch in an outer circumference of the yoke located on an outer peripheral side of the slot, the outer circumference of the stator core is not in contact with the housing in the notch. Consequently, the vibration is not transmitted to the housing from the notch, and stress is not applied to the yoke, whereby iron loss is reduced, vibration and noise of the motor are reduced, and in addition, high efficiency can be realized.

According to a motor according to claim 3 of the present invention, a plurality of notches are provided in an outer circumference of the yoke located on an outer peripheral side of the slot, and the stator core is not in contact with the housing at least on an extension line of an outer circumference thereof at a substantially central portion with respect to a peripheral direction of the slot. Consequently, the vibration mode of the motor can be changed, vibration transmitted to the housing from the yoke can be suppressed, and stress applied to the yoke can be reduced, thus making it possible to reduce vibration and noise of the motor and realize high efficiency in addition.

According to a motor according to claim 4 of the present invention, by providing notch in an outer circumference of the yoke located on an outer peripheral side of the slots, the outer circumference of the stator core is not in contact with the housing in the notch; and in addition, the yoke located on an outer circumferential side of the teeth is provided with axially penetrating through-holes, and the outer circumference of the stator core located on outer circumferential sides of the through-holes is in close contact with the housing. Consequently, the radial force applied to the teeth can be distributed by the through-holes and restrained from being transmitted to the housing, and the vibration is not transmitted to the housing from the notches, whereby the vibration and noise of the motor can be reduced, in addition, the outer circumference of the stator core located on the outer circumferential sides of the through-holes is in close contact with the housing, whereby the holding force of the stator core and the housing can be sufficiently kept, and stress is not applied to the yoke, whereby iron loss is reduced, and the motor with high efficiency, less vibration, low noise and high reliability can be obtained.

According to a motor according to claim 5 of the present invention, in the notch provided in the outer circumference of the yoke located on the outer peripheral side of the slot, the notch is provided to be in a substantially arc shape to be substantially concentric with the housing. Consequently, the shape of the notch can be made in the minimum size to prevent vibration from being transmitted to the housing from the stator core, whereby area of the slot can be made larger, and efficiency of the motor is enhanced.

The motor according to the present invention having the aforesaid unique effects is loaded on a hermetically enclosed compressor, a refrigerating machine, an air conditioner, or an electronic circuit cooling system or a car actuator, and an automobile or the like loaded with this, whereby these apparatuses can be made highly efficient, with less vibration and low noise.

What is claimed is:

1. A motor comprising:

a housing;

a stator having inner circumference, comprisng:

an annular yoke, a plurality of teeth;

a stator core having a plurality of slots, each two adjacent teeth having a slot therebetween, with three-phase concentrated winding wires wound around a portion of each of the teeth, said stator having an outer circumferential surface partially in contact with and held by the housing; and a rotor having an axis of rotation and rotatably held in opposed relation to the inner circumference of said stator with a clearance therebetween, and comprising permanent magnets embedded in or on a surface of the rotor;

wherein the stator has a plurality of grooves in the outer circumferential surface of the stator and extending parallel to said axis of rotation and throughout the axial thickness of the stator, each of said grooves being radially outward of one of said teeth.

2. The motor according to claim 1, wherein when the number of teeth is assumed to be N, the stator core is in close contact with the housing in at least N/2 locations out of N locations on the outer circumferential surface of the stator located radially outward of said teeth.

3. An apparatus comprising in conjunction therewith the motor recited in claim 1.

4. A motor comprising:

a housing;

a stator having an inner circumference comprising:

an annular yoke, a plurality of teeth;

a stator core having a plurality of slots, each two adjacent teeth having a slot therebetween, with three-phase concentrated winding wires wound around a portion of each of the teeth, said stator having an outer circumferential surface partially in contact with and held by the housing; and a rotor having an axis of rotation and rotatably held in opposed relation to the inner circumference of said stator with a clearance therebetween, and comprising permanent magnets embedded in or on a surface of the rotor;

wherein the stator has a plurality of notches in the outer circumferential surface of the stator and extending parallel to said axis of rotation and throughout the axial thickness of the stator, each of said notches being radially outward of an outer periphery of one of said slots so that the outer circumferential surface of the stator core does not contact the housing at least at each notch.

5. The motor according to claim 4, wherein each of the plurality of notches is substantially concentric with the housing.

6. A motor comprising:

a housing;

a stator having an inner circumference, comprising:

an annular yoke, a plurality of teeth;

a stator core having a plurality of slots each two adjacent teeth having a slot therebetween, with three-phase concentrated winding wires wound around a portion of each of the teeth, said stator having an outer circumferential surface partially in contact with and held by the housing; and a rotor having an axis of rotation and rotatably held in opposed relation to the inner circumference of said stator with a clearance therebetween, and comprising permanent magnets embedded in or on a surface of the rotor;

wherein the stator has a plurality of notches in the outer circumferential surface of the stator, and extending parallel to said axis of rotation and throughout the axial thickness of the stator, and located radially outward of an outer periphery of a slot so that the outer circumferential surface of the stator core does not contact the housing at least at said notches.

7. A motor comprising:

a housing;

a stator having an inner circumference, comprising:

an annular yoke, a plurality of teeth; and a stator core having a plurality of slots, each two adjacent teeth having a slot therebetween, with three-phase concentrated winding wires wound around a portion of each of the teeth, said stator having an outer circumferential surface partially in contact with and held by the housing; and a rotor having an axis of rotation and rotatably held in an opposed relation to the inner circumference of said stator with a clearance therebetween, and comprising permanent magnets embedded in or on a surface of the rotor;

wherein the stator has a plurality of notches in the outer circumferential surface of the stator, and extending parallel to said axis of rotation and throughout the axial thickness of the stator, each of said notches being radially adjacent an outer periphery of a slot, so that the outer circumferential surface of the stator core does not contact the housing at each notch; and a plurality of grooves extending parallel to said axis of rotation and throughout the axial thickness of the stator, each groove in the outer circumferential surface of the stator and located radially outward of one of said teeth, so that the outer circumferential surface of the stator does not contact the housing at each groove.

* * * * *